United States Patent [19]

Vedrine et al.

[11] 4,230,598
[45] Oct. 28, 1980

[54] PHOSPHOR AND PROCESS FOR PREPARING SAME

[75] Inventors: Alain Vedrine, Clermont-Ferrand; Jean-Claude Gacon, Fontaines sur Saone; Georges Boulon, Lyon; Danielle Trottier, Chamalieres, all of France

[73] Assignee: Agence Nationale de Valorisation de la Recherche, Neuilly sur Seine, France

[21] Appl. No.: 936,867

[22] Filed: Aug. 25, 1978

[30] Foreign Application Priority Data

Aug. 29, 1977 [FR] France .................. 77 26779

[51] Int. Cl.$^3$ .................................... C09K 11/46
[52] U.S. Cl. .................. 252/301.4 H; 313/486; 331/94.5 F
[58] Field of Search ............... 252/301.4 H; 313/486; 331/94.5 F

[56] References Cited

U.S. PATENT DOCUMENTS

| | | |
|---|---|---|
| 3,233,189 | 2/1966 | Guggenheim et al. ... 252/301.4 H X |
| 3,630,945 | 12/1971 | Hoffman ................. 252/301.4 H |
| 3,702,828 | 11/1972 | Hoffman ................. 252/301.4 H |
| 4,122,349 | 10/1978 | Fouassier et al. ........ 252/301.4 H X |

OTHER PUBLICATIONS

Stevels "J. Lummescence" 12/13 (1976) pp. 97–107.
Pierce et al. "Chem. Abstracts", vol. 85, 1976.

Primary Examiner—Jack Cooper
Attorney, Agent, or Firm—Stevens, Davis, Miller & Mosher

[57] ABSTRACT

A phosphor of the fluoride type mixed with potassium and yttrium doped with divalent europium, characterized in that it responds to the formula $$K_{(1-x)}Eu_xY_3F_{10+x}$$

wherein x is less than 0.06. The invention also concerns a process for preparing this product which may be used in a laser.

6 Claims, No Drawings

PHOSPHOR AND PROCESS FOR PREPARING SAME

The invention concerns a new phosphor and a process for preparing, and applications of, the phosphor.

Luminescence is a property of numerous substances which emit light under the effect of an excitation. The excitation may be of diverse origin, such as mechanical, electrical, thermal or others. Advantageously, the excitation is of luminous origin. Depending upon whether it is a transitory or a residual manifestation, one speaks of "fluorescence" or "phosphorescence". In the English literature, these bodies are generally designated "phosphors".

The article of A.L.N. STEVELS published in the Journal of Luminescence 12/13 (1976) pp. 97–107 describes in detail compositions useful as phosphors.

It has already been proposed to use as phosphors fluorides mixed with potassium and yttrium doped with trivalent europium. As is known "doping" is an operation which consists in substituting in a part of a composition an ion given by a weak quantity of another ion called a "dopant" or "activator". In this case, the doping is effected on yttrium by mixing yttrium trifluoride, europium trifluoride and potassium fluoride in such proportions that after a convenient thermal treatment, one obtains a phase of formula:

$$KY_{3-x}Eu_x^{(+3)}F_{10}$$

That phase is luminescent and exhibits the classic emission spectrum of the trivalent europium ion, said line spectrum being in the visible region.

The invention is another type of phosphor also of the fluoride type mixed with potassium and yttrium, but doped with europium. It is characterized in that it corresponds to the formula:

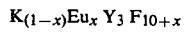

$$K_{(1-x)}Eu_x Y_3 F_{10+x}$$

The phase $K_{(1-x)}Eu_x^{+2}Y_3F_{10+x}$ has a crystal structure identical to that of the matrix $KY_3F_{10}$ (similar to fluorite, $CaF_2$) up to a value of x equal to 0.06, determined by radiocrystallographic analysis with the aid of a diffractometer C.G.R. θ60. The optimal luminescence is obtained where x is between 0.01 and 0.03 and, in contrast to materials of formula $K Y_{3-x}Eu_x^{+3}F_{10}$, one obtains an emission of intense monochromatic luminescence in the near ultraviolet about 3600 Angstroms.

A process for preparing the phosphor of the type in which the matrix is constituted of potassium fluoride doped with divalent europium and yttrium trifluoride is characterized as follows:

The divalent europium is introduced in the form of a composition selected from the group consisting of europium difluoride $EuF_2$, europium trifluoride $EuF_3$ reduced in situ, and a mixture of europium trifluoride and metallic europium in stoichiometric proportions. One heats the mixture to 900° C. under reduction conditions. Finally the mixture is permitted to slowly cool and the composition is obtained at ambient temperature.

If one slightly heats the mixture in a graphite crucible in a hydrogen atmosphere or in a platinum or gold ampoule, one obtains better results in comparison with the sealed ampoules of nickel. This last compound (nickel), owing to the fact of its reducing properties, causes the transformation of the divalent europium ion to the trivalent ion.

The heating operation is advantageously carried out for 15 hours, after which slow cooling is permitted to obtain the composition.

The manner in which the invention is realized and the advantages which flow therefrom will be brought out better by the following example, which is intended to be indicative and not limiting, concerning the particular composition $K_{(1-x)}Eu_x^{+2}Y_3F_{10+x}$ wherein $x=0.03$.

First one prepares all of the europium difluoride ($EuF_2$) by reducing the trifluoride ($EuF_3$) with hydrogen dried over phosphoric anhydrate. This reduction is effected by successive steps: (1) 2 hours under vacuum at 15° C.; (2) 3 hours under hydrogen at 800° C.; (3) 15 hours under hydrogen at 1100° C.; (4) 8 hours under hydrogen at 1300° C.

For entirely preventing the process of hydration, the later manipulations are carried out in a box with gloves.

One mixes with the obtained europium difluoride, in the desired proportions and in solid phase, potassium fluoride (KF) and yttrium fluoride preliminarily dehydrated at 500° C. under a nitrogen stream, then again under a secondary vacuum.

The mixture is then finely ground, for example in an agate mortar, and then is placed in an ampoule of nickel sealed with an oxyacetylene torch. The nickel, which provides the reduction properties, prevents the transformation of divalent europium to trivalent europium. The ampoule is then heated to 900° C. for 15 hours in a tubular oven, and then slowly cooled just to ambient temperature.

As for the composition $KY_3F_{10}$ doped with trivalent europium, the product obtained is a non hygroscopic white powder with uniform melting (at about 1000° C.) and without polymorphic transformation. This permits consideration of the growth of single crystals of important height by drawing, with very good chances of success.

One makes optical studies of the composition under the following conditions: Excitation Spectrum:

hydrogen lamp so that the continuous spectrum is in the ultraviolet;

a Hilger & Watt "Monospek 1000" monochrometer (grating of 1200 traces per millimeter blazed at 5000 Angstroms and of linear dispersion of 8.2 Angstroms per millimeter);

the measurements are made from 4° Kelvin to 550° Kelvin with the aid of two cryostats, the first for working from 550° to 77° K., the second therebelow. Emission Spectra:

The same apparatus as above, but the excitation source is replaced by a low pressure mercury vapor lamp which emits radiation principally of 2537 Angstroms.

It has been determined that the composition according to the invention $K_{1-x}Eu_xY_3F_{10+x}$ at temperatures lower than 550° K. (277° C.), under ultraviolet excitation, presents an emission of luminescence whose spectrum of very high resolution is constituted of three ultraviolet lines which are very fine and very close together. The intensity of the principal component at 3585 Angstroms appears quite grandly up to a temperature in the neighborhood of 400° K. (127° C.).

In the case of the luminescent composition according to the invention $K_{1-x}Eu_xY_3F_{10+x}$, all of the energy emitted in the form of radiation at the time of the deexcitation is concentrated in a very narrow spectral domain, principally at the line 3585 Angstroms of which the larger by half-higher is lower by 10 Angstroms. In return the greater part of the other active compositions of divalent europium, the energy emitted in the form of radiation is principally dispersed in a spectral interval the larger one of several hundred Angstroms; one very feeble part is found as a narrow ultraviolet emission. Finally, in the composition where trivalent europium is incorporated in the same matrix $KY_3F_{10}$, the energy emitted in the form of radiation is dispersed together with the visible spectrum in the grouping of lines.

As elsewhere, the excitation of the luminescence is made by optical pumping with the strength and wide ultraviolet absorption band constituted by the energy levels of the excited configuration $4f^6-5d$, then by non-radiative disexcitation across the level $^6P_{7/2}$ of the configuration $4f^7$ from which is effectuated the emission of the luminescence.

The emission of luminescence is favored in the composition according to the invention $K_{1-x} Eu_x Y_3 F_{10+x}$ by:

(1) the strong probability of absorption transitions occurring during the optical pumping;

(2) the low energy variation between the lowest level of the configuration $4f^6-5d$ and the emitter level $^6P_{7/2}$ of the configuration $4f^7$;

(3) the absence of emission of luminescence upon leaving the levels of the configuration $4f^6-5d$;

(4) the elevated value of the probability of the non-radiative transitions between the levels $4f^6-5d$ and the emitter level $^6P_{7/2}$;

(5) the elevated value of the duration of life of the emitter level which is greater than 2.8 milliseconds at ambient temperature.

The optical and crystallo-chemical characteristics of the composition according to the invention $K_{1-x} Eu_x Y_3 F_{10+x}$ permits consideration of its utilization in an ultraviolet laser. The powdered form of this composition may be put to good use with all of the techniques calling for an intense monochromatic ultraviolet radiation (3585 Å), such as fluorescence or photocopying.

Other applications may be cited, such as those enumerated in the article in Journal of Luminescence, 13/13 (1976) pp. 97–107 cited above, notably as an initiator of polymerization, for medical lamps, sensitizers for other luminescent cations, etc.

Finally, the cost of the compositions according to the invention is relatively moderate and their manufacture does not necessitate complex and onerous apparatus.

What is claimed is:

1. A divalent europium activated potassium yttrium fluoride phosphor which corresponds to the formula:

$$K_{(1-x)} Eu_x Y_3 F_{10+x}$$

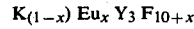

wherein x is positive and up to 0.06, the said phosphor emitting an intense monochromatic emission centered about 3585 Angstroms when excited by ultraviolet radiation at temperatures below 400° K.

2. The phosphor of claim 1 wherein x is in the range between 0.01 and 0.03.

3. A laser source comprising the phosphor of claim 1.

4. A lamp including the phosphor of claim 1.

5. A process for preparing a divalent europium activated potassium yttrium fluoride phosphor which corresponds to the formula $K_{(1-x)} Eu_x Y_3 F_{10+x}$, wherein x is positive and up to 0.06, said phosphor emitting an intense monochromatic emission centered about 3585 Angstroms when excited by ultraviolet radiation at temperatures below 400° K., comprising:

mixing in potassium fluoride, yttrium trifluoride and a divalent europium based doping agent in amounts corresponding to said formula, the said doping agent being selected from the group consisting of europium difluoride and a mixture of metallic europium and europium trifluoride in stoichiometric proportions;

heating said resultant mixture at 900° C. for 15 hours under reduction conditions; and then permitting the mixture to slowly cool thus obtaining the phosphor.

6. The process of claim 5, wherein the initial mixture is finely ground and placed in a sealed nickel ampoule.

* * * * *